(12) United States Patent
Giroux et al.

(10) Patent No.: US 11,845,509 B2
(45) Date of Patent: Dec. 19, 2023

(54) BICYCLE SUSPENSION

(71) Applicant: CYCLES DEVINCI INC., Chicoutimi (CA)

(72) Inventors: Michel Giroux, Jonquiere (CA); Christophe Riopel-Benoit, Chicoutimi (CA)

(73) Assignee: CYCLES DEVINCI INC., Chicoutimi (CA)

(*) Notice: Subject to any disclaimer, the term of this patent is extended or adjusted under 35 U.S.C. 154(b) by 463 days.

(21) Appl. No.: 17/186,602

(22) Filed: Feb. 26, 2021

(65) Prior Publication Data
US 2021/0276659 A1    Sep. 9, 2021

Related U.S. Application Data

(60) Provisional application No. 62/986,088, filed on Mar. 6, 2020.

(30) Foreign Application Priority Data

Mar. 9, 2020 (CA) ....................... 3075064

(51) Int. Cl.
*B62K 25/28*     (2006.01)
*B62K 25/30*     (2006.01)
*B62K 25/10*     (2006.01)

(52) U.S. Cl.
CPC ............ *B62K 25/286* (2013.01); *B62K 25/10* (2013.01); *B62K 25/30* (2013.01); *B62K 2201/00* (2013.01)

(58) Field of Classification Search
CPC ....... B62K 25/10; B62K 25/30; B62K 25/286
See application file for complete search history.

(56) References Cited

U.S. PATENT DOCUMENTS

| | | | |
|---|---|---|---|
| 5,413,368 A | 5/1995 | Pong et al. | |
| 6,045,470 A | 4/2000 | Wilcox et al. | |
| 7,210,695 B2 | 5/2007 | Griffiths | |
| 7,395,892 B2 | 7/2008 | Evans | |
| 7,717,212 B2 | 5/2010 | Weagle | |
| 8,851,498 B2 | 10/2014 | Alsop | |
| 9,168,977 B2 | 10/2015 | Mcleay | |
| 9,908,583 B2 * | 3/2018 | Matheson | ................ B62K 3/02 |

(Continued)

FOREIGN PATENT DOCUMENTS

| | | |
|---|---|---|
| CA | 2865915 C | 9/2013 |
| GB | 2338216 A | 12/1999 |
| GB | 2522461 A | 7/2015 |

*Primary Examiner* — Tony H Winner
*Assistant Examiner* — Hosam Shabara
(74) *Attorney, Agent, or Firm* — Norton Rose Fulbright Canada LLP

(57) ABSTRACT

A bicycle has a frame with a rear suspension defining a suspension travel. The rear suspension includes a wheel link, a separate brake link, and a shock linkage. The wheel link is connected to the frame. The wheel link and the brake link are connected to each other via a floating pivot concentric with the rear wheel axis. The wheel link having an idler with a pivot axis below a projection line extending from the floating pivot to the main fixed pivot axis. The main fixed pivot axis is higher than the floating pivot when the rear suspension is at rest. The shock linkage is mounted to the frame via a fixed shock linkage pivot and interconnects the brake link and a shock absorber fixed on the frame.

20 Claims, 12 Drawing Sheets

(56) References Cited

U.S. PATENT DOCUMENTS

| | | | |
|---|---|---|---|
| 10,377,442 B2 | 8/2019 | Neilson | |
| 2008/0067772 A1* | 3/2008 | Weagle | B62K 25/286 |
| | | | 280/124.134 |
| 2013/0093160 A1* | 4/2013 | Alsop | B62K 25/04 |
| | | | 29/428 |
| 2021/0269117 A1* | 9/2021 | Zawistowski | B62M 6/40 |

* cited by examiner

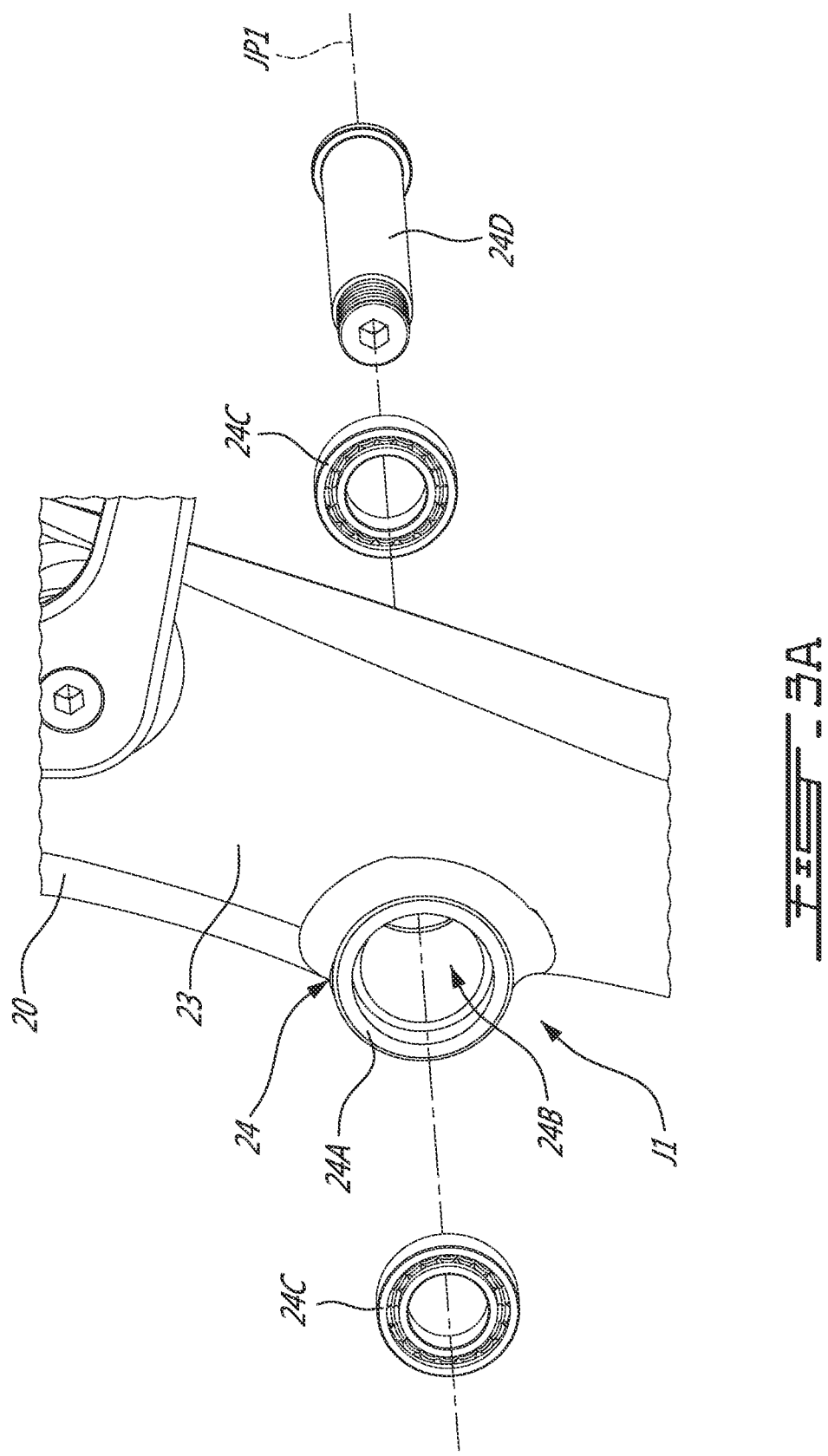

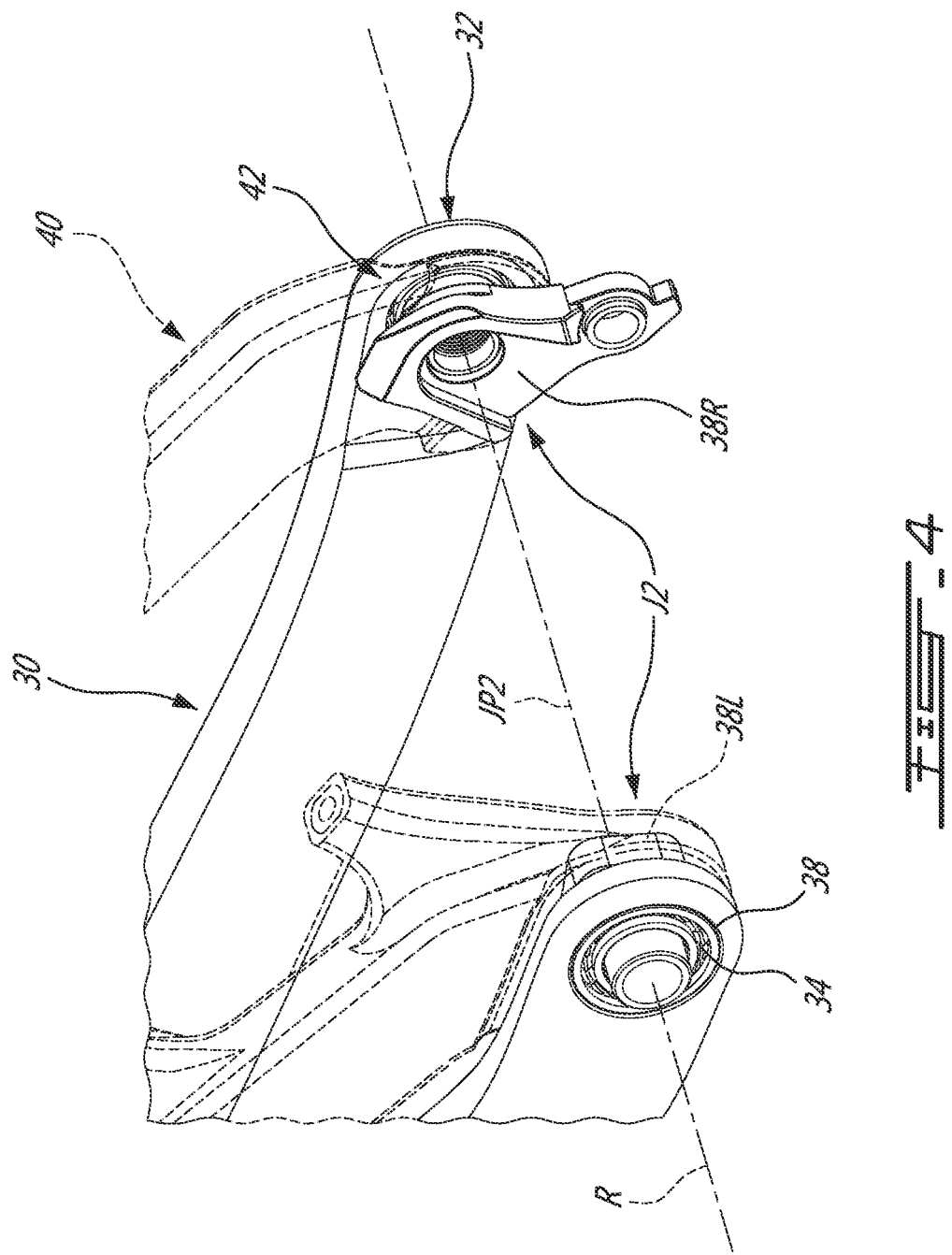

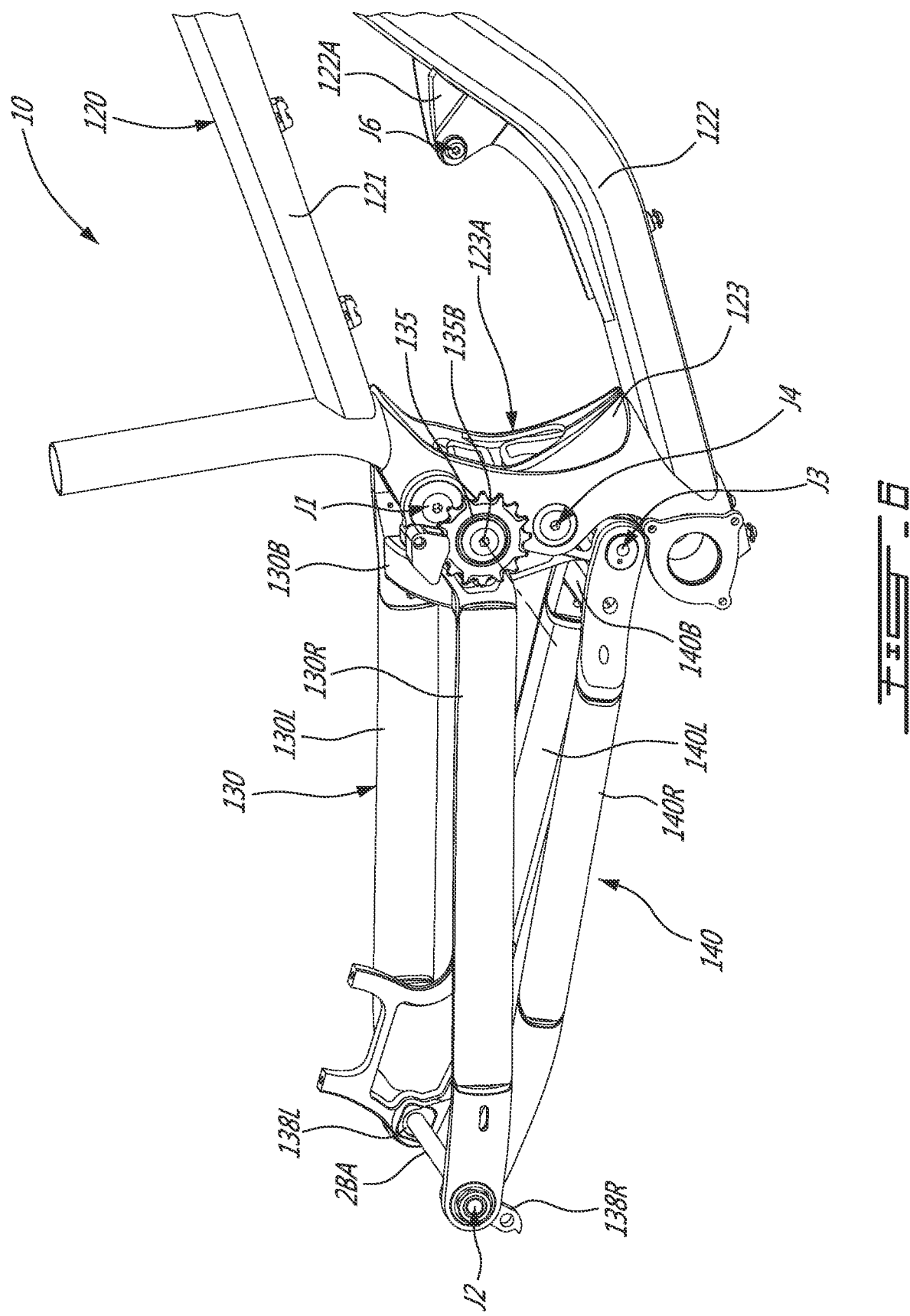

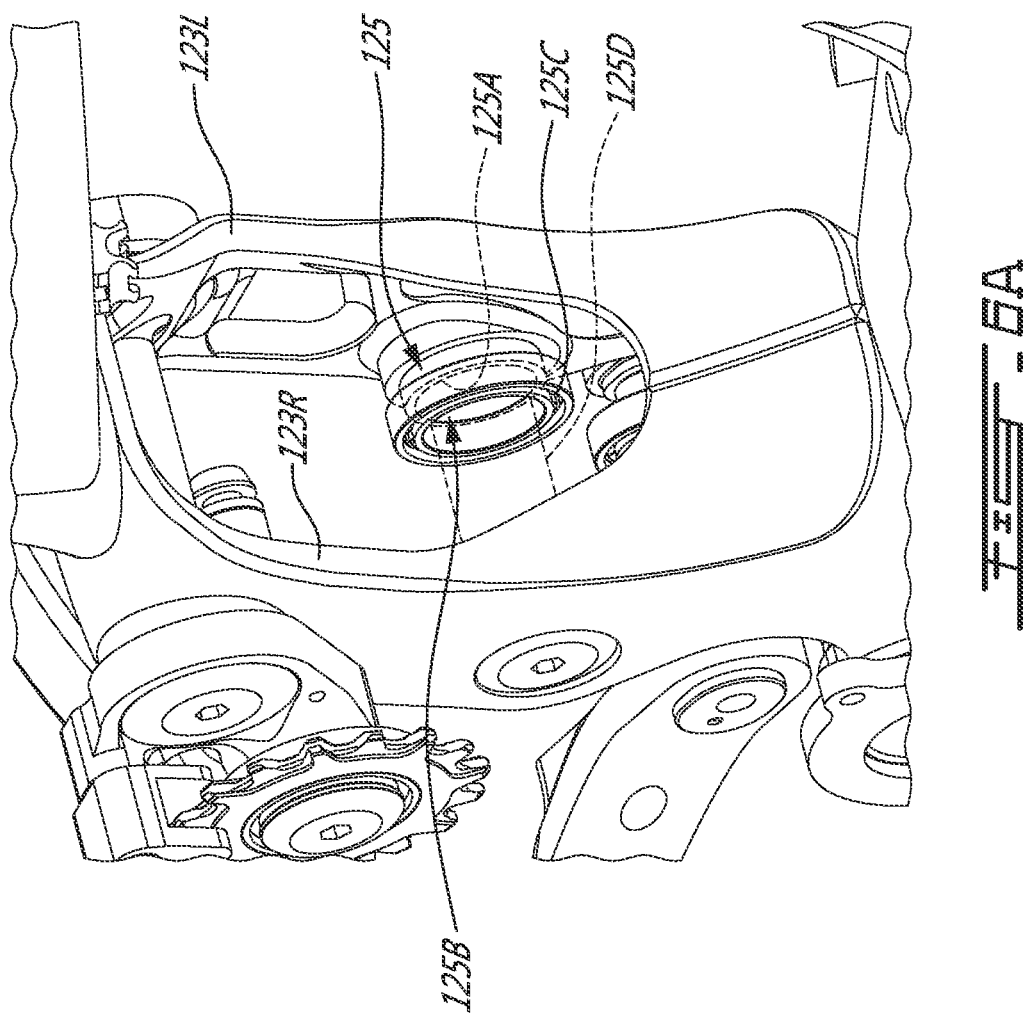

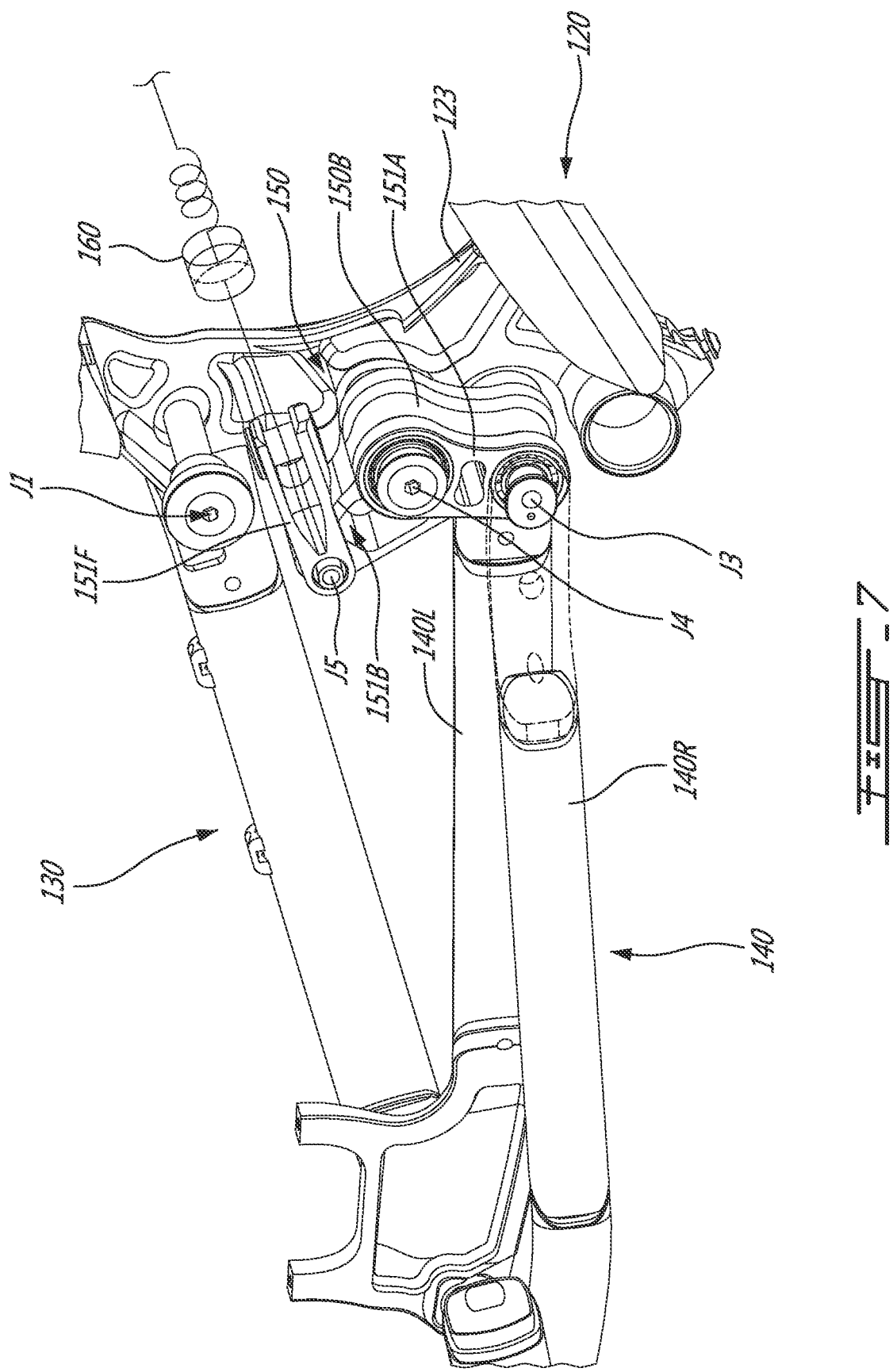

BICYCLE SUSPENSION

CROSS-REFERENCE TO RELATED APPLICATIONS

This application claims priority of Canadian Patent Application No. 3,075,064, filed on Mar. 9, 2020, and U.S. Provisional Patent Application No. 62/986,088, filed on Mar. 6, 2020, the entire contents of which are incorporated herein by reference.

TECHNICAL FIELD

The application relates generally to bicycle suspensions and, more particularly, to a bicycle rear suspension.

BACKGROUND OF THE ART

Rear suspension configurations for bicycle, more specifically for off-road bikes, such as mountain bikes, downhill bikes, and the like, have various suspension geometries and characteristics. Rear suspension configurations affect the bicycle dynamics during use, notably traction and maneuverability when riding on rough terrains, for example. The approach to develop bicycle suspensions is strenuous and multifactorial. Characteristics of the rear suspension, amongst others, may affect the dynamic behavior of the bicycle during use. There remains space for improvements in the field of bicycle suspensions.

SUMMARY

In one aspect, there is provided a frameset of a bicycle, comprising: a frame having a bottom bracket defining a crankset rotational axis, the frame defining a rear suspension pivot at a higher elevation than the crankset rotational axis; and a rear suspension for suspending a rear wheel of the bicycle, the rear suspension defining a suspension travel of the suspended rear wheel relative to the frame, the rear suspension including a wheel link, a brake link separate from the wheel link, and a shock linkage, the wheel link pivotally connected to the rear suspension pivot of the frame thereby defining a main fixed pivot axis, the wheel link and the brake link pivotally connected to each other via a first floating pivot, the first floating pivot concentric with a rear wheel rotational axis, an elevation of the main fixed pivot axis relative to the first floating pivot corresponding to between 30% and 125% of the suspension travel when the rear suspension is in a rest position and unloaded, the shock linkage pivotally mounted to the frame at a fixed location thereon, the brake link and the shock linkage pivotally connected to each other via a second floating pivot, the wheel link having an idler pivotally mounted thereto, the idler configured to intermesh with an upper chain segment running from a rear wheel sprocket to a chain ring, the idler having an idler pivot axis positioned below a projection line extending from the first floating pivot to the main fixed pivot axis.

In another aspect, there is provided a bicycle, comprising: a frame having a bottom bracket defining a crankset rotational axis, the frame defining a rear suspension pivot located at a higher elevation than the crankset rotational axis; a drive unit mounted to the bottom bracket, the drive unit including a crankset drivingly engaged to a sprocket of a rear wheel via a chain; a front wheel mounted to the frame via a steerable front fork; a rear suspension suspending a rear wheel mounted to the rear suspension via a rear wheel axle for rotation about a rear wheel axis, the rear suspension defining a suspension travel of the suspended rear wheel relative to the frame, the rear suspension including: a wheel link, a brake link separate from the wheel link, and a shock linkage, the wheel link pivotally connected to the rear suspension pivot of the frame thereby defining a main fixed pivot axis, the wheel link and the brake link pivotally connected to each other via a first floating pivot, the first floating pivot concentric with the rear wheel axis, the wheel link having an idler pivotally mounted thereto, the idler engaging a chain segment between the sprocket of the rear wheel and the crankset, the idler having an idler pivot axis positioned below a projection line extending from the first floating pivot to the main fixed pivot axis, an elevation of the main fixed pivot axis relative to the first floating pivot corresponding to between 30% and 125% of the suspension travel when the rear suspension is in a rest position and unloaded, the shock linkage pivotally mounted to the frame via a shock linkage pivot on the frame, the brake link and the shock linkage pivotally connected to each other via a second floating pivot, a shock absorber having a first end pivotally mounted to the frame at a fixed location thereon and a second end pivotally mounted to the shock linkage via a third floating pivot.

DESCRIPTION OF THE DRAWINGS

Reference is now made to the accompanying figures in which:

FIG. 4 is a magnified partial perspective view of components of the rear suspension of FIG. 3, when viewed from the rear of the bicycle;

FIG. 6 is a partial perspective view of a frameset with a rear suspension according to another embodiment;

FIG. 6A is a magnified view of a pivot component on the frame of the frame set with the rear suspension shown in FIG. 6;

FIG. 7 is another partial perspective view of the frameset with the rear suspension as shown in FIG. 6, with some components hidden to show components not observable in FIG. 6.

DETAILED DESCRIPTION

Figure 1:
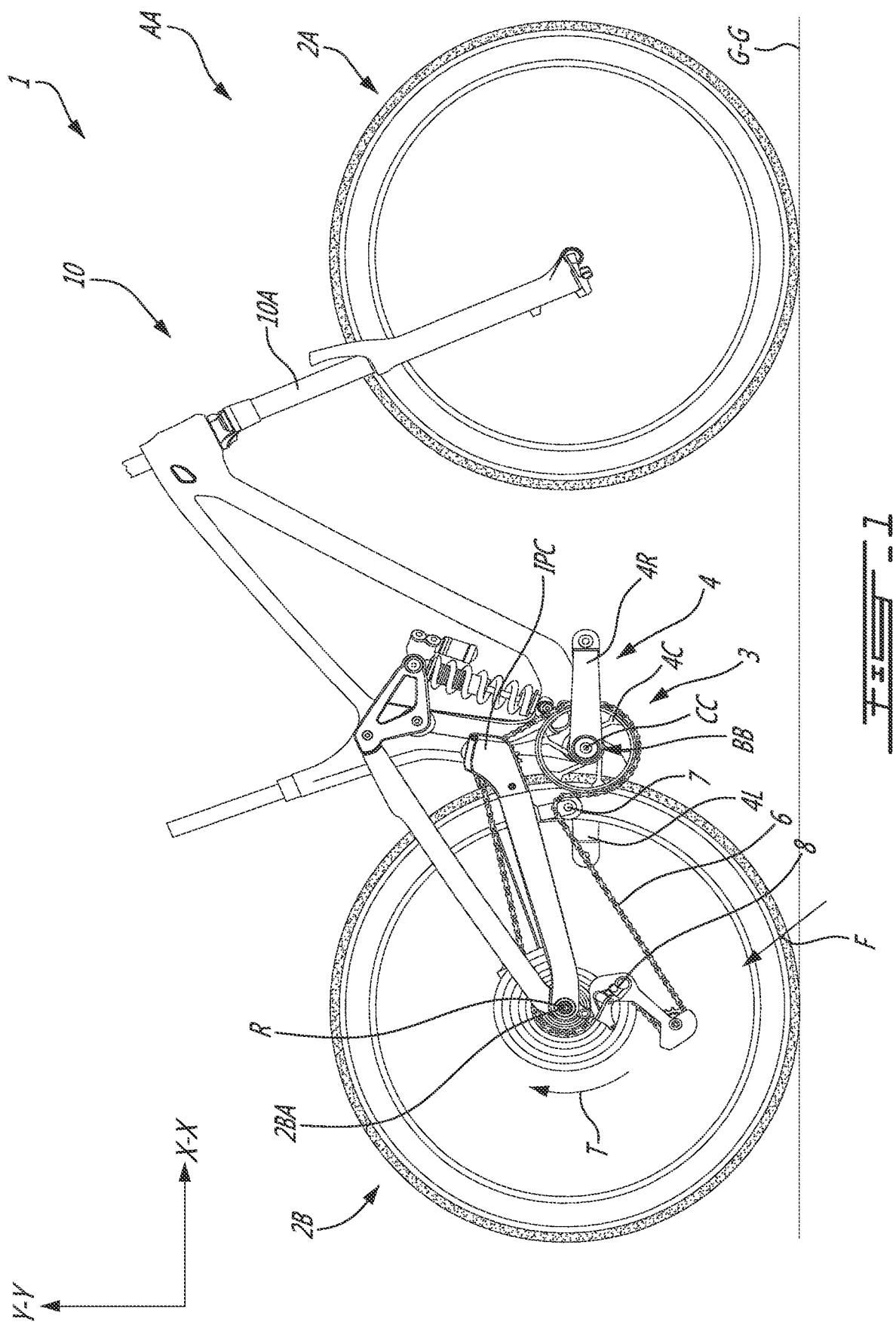
FIG. 1 is a side elevational view of a bicycle on an horizontal plane G-G extending along longitudinal axis X-X, the bicycle viewed in a vertical plane AA extending along vertical axis Y-Y, according to an embodiment.

FIG. 1 illustrates a bicycle 1, in particular an off-road bicycle, also known as a mountain bike. The bicycle 1 has two wheels, namely a front wheel 2A and a rear wheel 2B. The bicycle includes a drivetrain 3 to convert torque applied by an external power source (e.g. a human, electric motor or combination thereof) into motive power transmitted to the rear wheel 2B against the ground, shown here as horizontal plane G-G extending along longitudinal axis X-X. As one possibility, such as shown, the drivetrain 3 includes a crankset 4 having a left and a right cranks 4L, 4R (pedals mounted to them are omitted on the figures) connected to a chain ring 4C. The crankset 4 may include more than one chain ring 4C depending on embodiments. In the embodiment shown, no front derailleur is required as the drivetrain 3 includes a single chain ring. The drivetrain 3 includes one or more sprocket 5, which may form part of a rear cassette mounted on the rear wheel 2B for rotation about a rear wheel axis R. The drivetrain 3 includes a chain 6 looped around portions of the sprocket 5 and the chain ring 4C. The chain 6 drivingly engages the sprocket 5 and the chain ring 4C to transmit torque exerted on the cranks 4L, 4R to the rear wheel 2B. In some embodiments, such as shown, a chain tensioner 7 may be part of the drivetrain 3 and may take up the change in tension in the lower chain segment, but this is optional. The rear derailleur 8 may or may not form part of the drivetrain 3, depending on the embodiments.

The bicycle 1 includes a frameset 10 and a front fork 10A, which may or may not be considered as part of the frameset 10. The front wheel 2A is rotatably mounted to the front fork 10A. The front fork 10A includes a front suspension to suspend the front wheel 2A, although this is optional. The description of other suspension, steering and/or braking components of the front fork 10A is omitted for conciseness.

Figure 2:
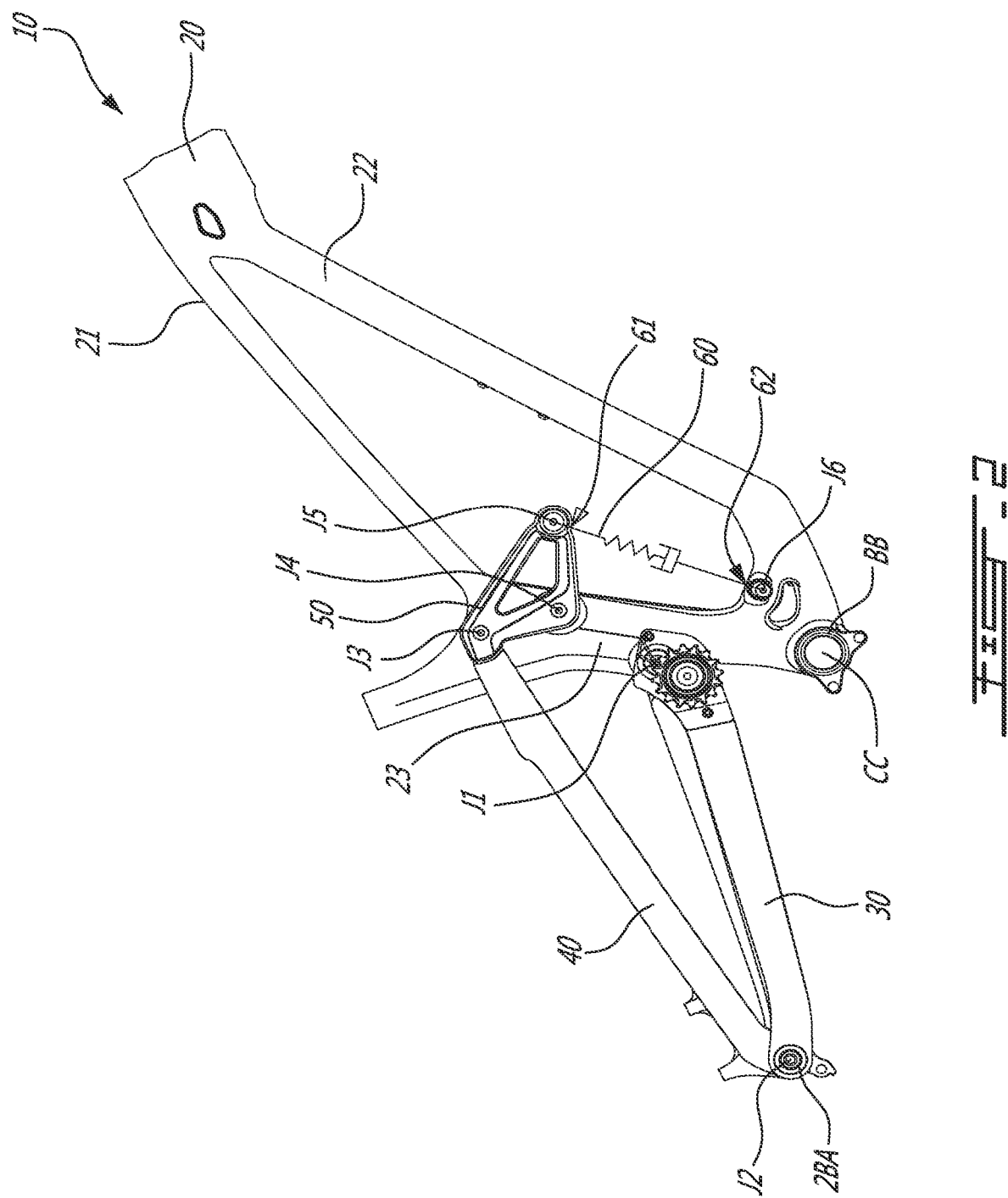
FIG. 2 is a side elevational view of a frameset of the bicycle shown in FIG. 1, according to an embodiment.
Figure 3:
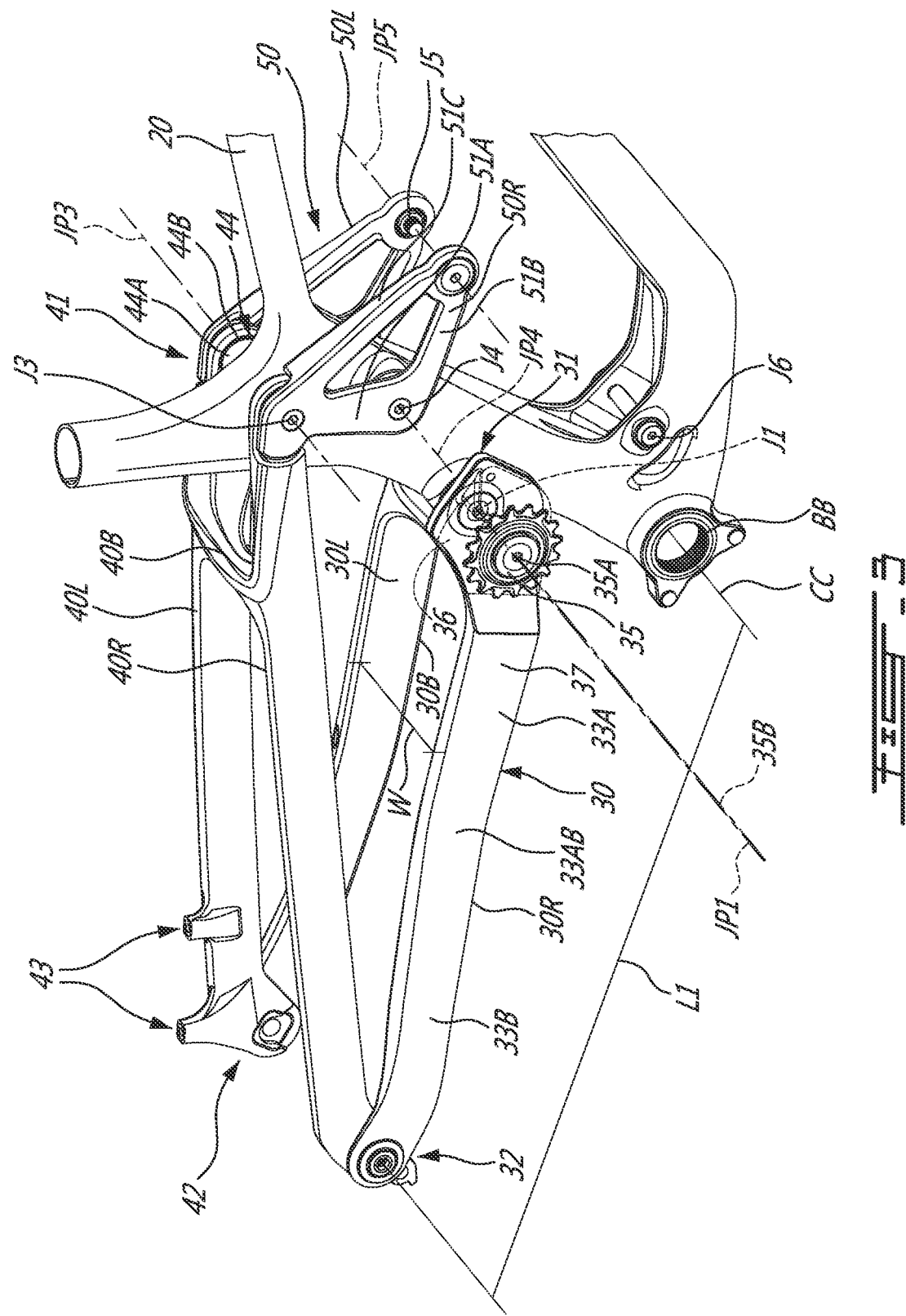
FIG. 3 is a partial perspective view of the frameset shown in FIG. 2, showing components of a rear suspension, according to an embodiment.

With reference to FIGS. 2-3, the frameset 10 includes a frame 20 and a rear suspension having a wheel link 30, a brake link 40, a shock linkage 50, and a shock absorber 60. The rear wheel 2B is mounted to the rear suspension via a wheel axle 2BA. As shown, components 20 30, 40, 50 and 60 are connected to one another via pivots. The wheel link 30 is pivotally connected to the frame 20 at pivot J1. The wheel link 30 and the brake link 40 are pivotally connected to each other at pivot J2. The brake link 40 and the shock linkage 50 are pivotally connected to each other at pivot J3. The shock linkage 50 is pivotally connected to the frame at pivot J4. The shock absorber 60 is pivotally connected to the shock linkage 50 at pivot J5 and to the frame 20 at pivot J6. The pivots J1, J2, J3, J4, J5 and J6 may all extend parallel to each other, that is normal to vertical plane A-A of the bicycle 1, as illustrated. Interfacing parts of the components 20 30, 40, 50 and 60 pivotally connected to each other form part of the pivots J1, J2, J3, J4, J5 and J6. More detail on the pivots J1, J2, J3, J4, J5 and J6 are described later.

Subject to an impact on the rear wheel 2B, for instance at a contact area and orientation illustrated by the arrow F in FIG. 1, the rear suspension induces a rearward and upward movement of the rear wheel axis R, thereby defining a wheel trajectory T. The vertical component of the wheel trajectory T (component of the movement along vertical axis Y-Y) defines a suspension travel Ty. Over the entire suspension travel Ty, the rear wheel 2B moves relative to the frame 20. The frame 20, wheel link 30, brake link 40, shock linkage 50, and shock absorber 60 move relative to each other because of their mutual pivotal interconnections. By interaction of the rear suspension, the shock absorber 60 opposes to a positive suspension travel to produce and/or maintain traction of the rear wheel 2B on the ground while riding. In one aspect, the rear suspension configuration may allow for a progressive response (or rate) of the shock absorber 60 dependent upon the suspension travel. Other aspects that may arise from the rear suspension configuration are discussed later.

Components 20, 30, 40, 50 and 60 and their interaction via the pivots J1, J2, J3, J4, J5 and J6 will now be individually described.

The frame 20 includes a top tube 21, a down tube 22 and a seat tube 23 forming a generally triangular geometry. The frame 20 may be formed as a monocoque (or "one-piece") structure, with the top tube 21, the down tube 22 and the seat tube 23 formed as a single part, as one possibility. This may be made using any suitable manufacturing technique, including molding. Tubes 21, 22, 23 may vary in shape and/or be made as separate parts then connected together via separate joints (e.g. adhesively bonded, welded, fastened, a combination thereof, or otherwise). A bottom bracket BB is defined at a junction between the down tube 22 and the seat tube 23. The bottom bracket BB defines a pedaling axis, or crankset axis CC. The bottom bracket BB is adapted to mount the crankset 4 to the frame 20. The bottom bracket BB is configured to receive a shaft of the crankset 4 along the crankset axis. As shown, the bottom bracket BB is located at the lowest point of the frame 20. When the bicycle 1 lies on a horizontal ground (plane G-G), the bottom bracket BB is at the lowest elevation from the ground when compared, at least, to pivots J1, J3, J4, J5, J6. While pivot J2 may also be at a higher elevation than crankset axis CC of the bottom bracket BB in some embodiments, it may be otherwise (i.e. lower) in other embodiments.

With reference to FIG. 3A, a frame pivot shoulder 24 forms part of the pivot J1. The frame pivot shoulder 24 projects transversely outwardly ("outwardly" with respect to bicycle 1) from a surrounding surface of the frame 20. The frame pivot shoulder 24 defines a flat plateau 24A for facing an opposite internal surface of the proximal end 31 of the wheel link 30. The frame pivot shoulder 24 is hollowed thereby defining a transverse hole 24B. The transverse hole 24B receives one or more bearing supports 24C, which may be roller (e.g. roller, ball, or else) bearings, or bushings, for instance to receive a pivot axle 24D (axle or shaft). The pivot axle 24D may be considered part of the frame 20 or the wheel link 30. The transverse hole 24B (and/or pivot axle 24D) defines a pivot axis JP1. The pivot axis JP1 is immovable ("fixed") with respect to the frame 20. As discussed later, the pivot axis JP1 defines the main fixed pivot of the rear suspension (as opposed to "floating").

Figure 3B:
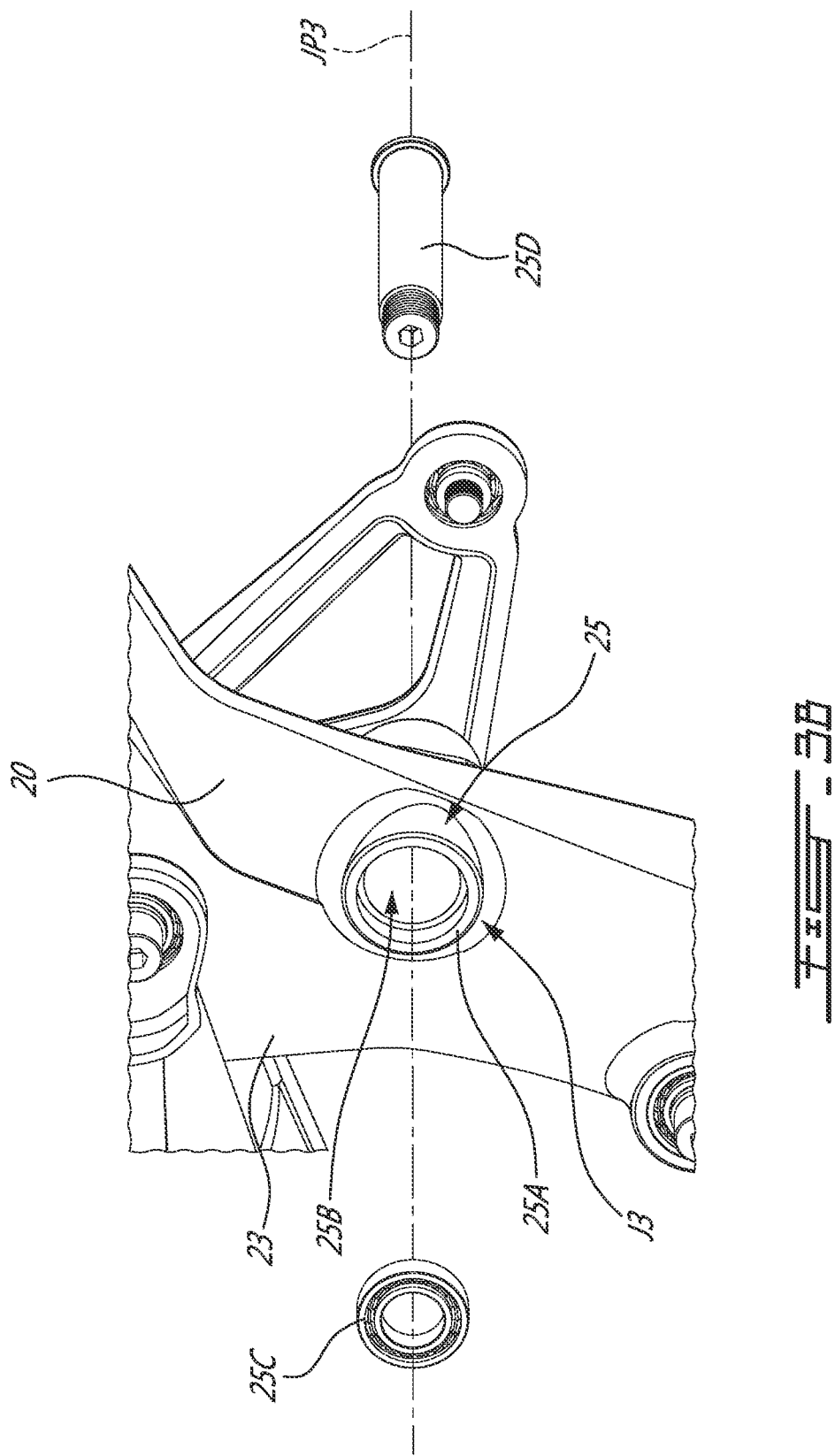
FIGS. 3A to 3C are magnified exploded views of pivots components on the frame of the frameset shown in FIG. 3.
Figure 3E:
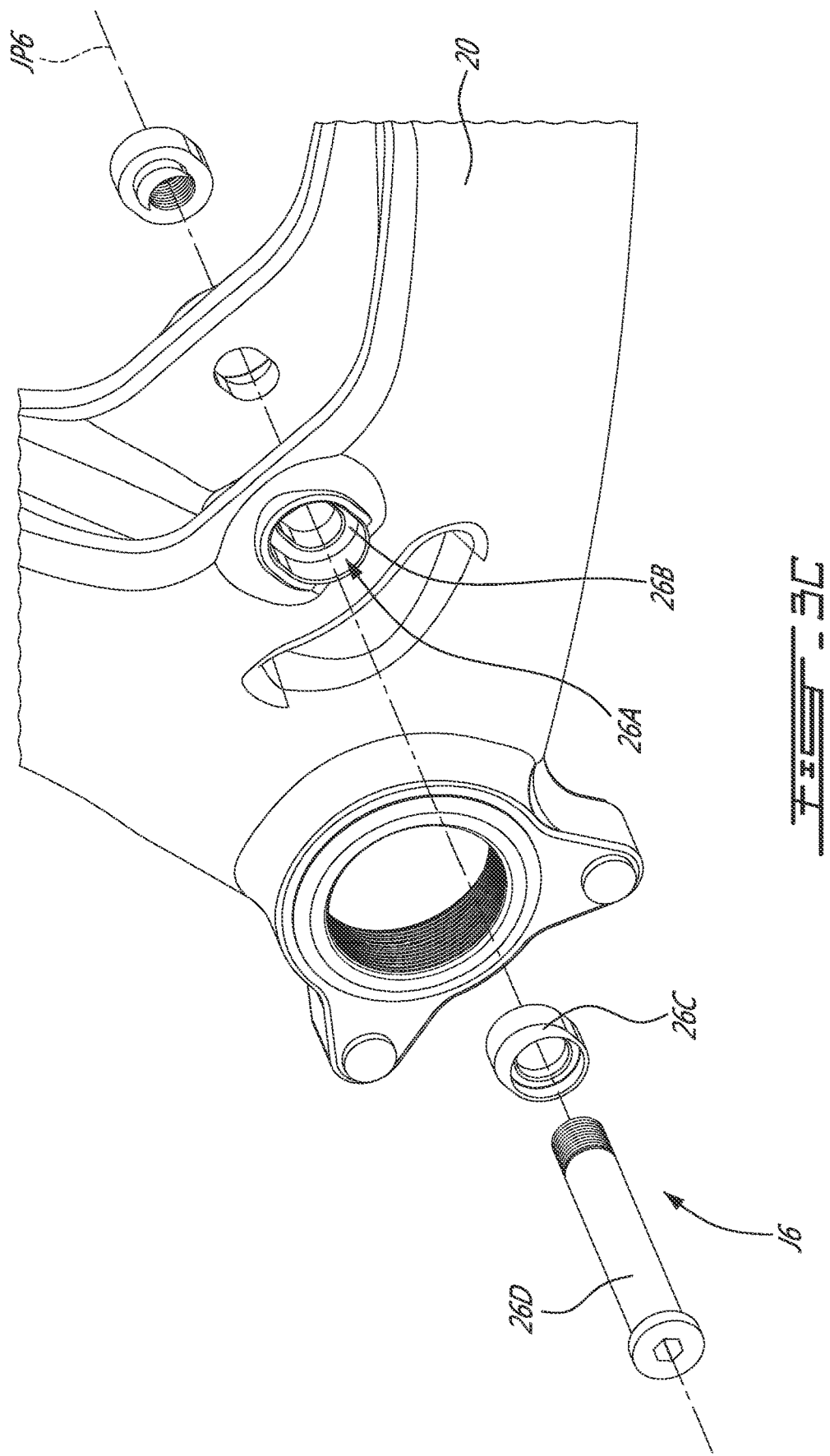

With reference to FIG. 3B, the frame 20 defines a linkage pivot shoulder 25, similar to the frame pivot shoulder 24 discussed above. The linkage pivot shoulder 25 projects transversely outwardly ("outwardly" with respect to bicycle 1) from a surrounding surface of the frame 20. The linkage pivot shoulder 25 defines a flat plateau 25A facing an opposite internal surface of the shock linkage 50. The linkage pivot shoulder 25 is hollowed thereby defining a transverse hole 25B. The transverse hole 25B receives one or more bearing supports 25C, which may be roller (e.g. roller, ball, or else) bearings, or bushings, for instance to receive a pivot axle 25D (axle or shaft). The pivot axle 25D may be considered part of the frame 20 or the shock linkage 50. The transverse hole 25B (and/or pivot axle 25D) defines a pivot axis JP4. The pivot axis JP4 is immovable ("fixed") with respect to the frame 20. The shock linkage 50 pivots about the pivot axis JP4 relative to the frame 20, as further discussed later.

With reference to FIG. 3C, the shock absorber 60 pivots relative to the frame 20 at pivot J6. The frame 20 defines a shock pivot recess 26A and a flat annular plateau 26B in the recess 26A at pivot J6. The frame 20 defines an oblong hole receiving a bearing support 26C, here in the form of a bushing. The bearing support 26C is recessed in the shock pivot recess 26A and abuts axially against the plateau 26B. In the depicted embodiment, the bearing support 26C has a peripheral shape in the oblong shape of the oblong hole. The bearing support 26C itself defines a hole to receive a shock pivot axle 26D. The bearing support 26C may be inserted upside down (or "reversed") in the recess 26A, to change the relative position of the hole receiving the pivot axle 26D, or change the relative position of pivot J6, with respect to other fixed pivots and/or crankset axis CC. This may allow fine-tuning of the suspension geometry on the bicycle 1. Such pivot axle 26D pivotally interconnect the shock absorber 60 and the frame 20 for rotation about the pivot axis JP6 at pivot J6. As is the case with pivots J1 and J3, pivot J6 has a pivot axis JP6 immovable ("fixed") with respect to the frame 20.

As shown in FIG. 3, in the depicted embodiment, the wheel link 30 includes a left and a right arm 30L, 30R extending on opposite sides of the frame 20. The left and right arms 30L, 30R are connected to each other via a transverse bridge 30B adjacent an axial end 31 of the wheel link 30 which is proximal to the frame 20. In the depicted embodiment, the transverse bridge 30B is integral with the left and right arms 30L, 30R, such that parts 30L, 30R and 30B are formed as a single piece. The left and right arms 30L, 30R and the transverse bridge 30B straddle the rear wheel 2B when the rear wheel 2B is mounted on the rear suspension. While the transverse bridge 30B may provide more stiffness to the wheel link 30, some embodiments may not have such transverse bridge 30B, such that the left and right arms 30L, 30R of the wheel link 30 may extend independently from each other. The wheel link 30 has a proximal end 31 and extends rearwardly from the frame 20 to a distal end 32. The spacing W between the sections of the left and right arms 30L, 30R that extend on opposite sides of the rear wheel 2B is narrower along a proximal section 33A of the wheel link 30, and such spacing widens along a distal section 33B of the wheel link 30. The wheel link 30 defines an outward bend 33AB along its length L1 where the proximal section 33A transitions to the distal section 33B, causing such widening. In the depicted embodiment, the outward bend 33AB is located at a median length (at a location between 45% and 55% of length L1) of the wheel link 30. Such widening may increase radial stiffness of 30L and 30R, and/or allow more space between the distal end 32 of the left and right arms 30L, 30R to receive the rear wheel 2B, sprocket 5 (FIG. 1) and rear braking system (not shown), including for instance a disc brake and disc brake hub, when applicable. The wheel link 30 may include internal passages (guides and/or hoses) along at least part of its length to route brake oil or cables to the rear braking system, and/or internal cables or electric wires to the rear derailleur 8 (FIG. 1), in the vicinity of the distal end 32, as one possibility. Such hoses, cables and/or wires may be external as well in some embodiments.

The wheel link 30 is pivotally connected to the frame 20 at pivot J1. The wheel link 30 includes bearing supports 34, herein bushings, which may be embedded in the wheel link 30 or fitted in pivot holes 34A defined in the wheel link 30 at a proximal end 31 thereof. Such bearing supports are adapted to receive the pivot axle 24D extending transversely therethrough, and through the frame 20 at the frame pivot shoulder 24.

In the depicted embodiment, the right arm 30R is on the drive side of the bicycle 1, in that it is located on the chain ring 4C, sprocket 5 and chain 6 side of the bicycle 1. The wheel link 30, in this embodiment the right arm 30R has an idler 35 pivotally mounted thereto. The idler 35 is a toothed gear, though it may be of other types, such as a pulley, for instance. The wheel link 30 includes an idler cover IPC (shown in FIG. 1 but hidden in the following figures), although this is optional. The idler 35 is configured to intermesh with an upper segment of the chain 6 that runs from the chain ring 4C to the sprocket 5. The idler 35 is mounted on an idler pivot axle 35A extending from the wheel link 30. Such idler pivot axle 35A may form part of the wheel link 30, for instance by being integral therewith, or pivotally connected to the wheel link 30 via one or more bushing supports (embedded into the wheel link 30 or assembled thereto) similar as those discussed above.

The wheel link 30 defines a recessed area 36 at end 31. The recessed area 36 defines a flat surface that is transversely offset in the vertical plane A-A relative to an adjacent outwardly facing surface 37 of the wheel link 30. The idler 35 is mounted in such recessed area 36. As such, the transverse position of the idler 35 with respect to the frame 20 is such that the plane of rotation of the idler 35 may coincide with the plane of rotation of the chain ring 4C (or one of the chain rings). This may improve alignment of the upper segment of the chain 6 between the idler 35 and the chain ring 4C, which in turn may improve engagement of the chain 6 on the chain ring 4C. Additionally or alternatively, having the recessed area 36 may allow a better transverse alignment of the idler 35 with the sprocket 5. For instance, the recessed area 36 may be adapted such that the plane of rotation of the idler 35 may coincide with the plane of rotation of the sprocket 5 (or at least one sprocket of the cassette, where applicable).

The idler 35 pivots about an idler pivot axis 35B that remains at a fixed distance from pivots J1, J2. The idler 35 is not mounted on an intermediary linkage, hence it remains fixed (i.e. idler axis 35B does not move) with respect to the wheel link 30, irrespective of the suspension travel position. Since the idler 35 is mounted to the wheel link 30, movement of the wheel link 30 with respect to the frame 20 about pivot J1 results in a corresponding movement of the idler 35 with respect to the frame 20. Having the idler 35 mounted on the wheel link 30 and not on an intermediary linkage or structure limits movable pieces, which may save weight, and/or this may allow a constant (or near constant) chain load impact on the suspension movement over the entire suspension travel, which may not happen when the idler 35 is fixed on the frame 20 or an intermediary linkage, for instance.

The idler axis 35B is located lower than pivot J1 with respect to the vertical axis Y-Y when the suspension is uncompressed (when the bicycle 1 is at rest and unloaded). The idler axis 35B is positioned below a projection line extending from pivot J2 (from its pivot axis JP2) to the pivot axis JP3. In some embodiments, the idler axis 35B remains lower than pivot J1 with respect to the vertical axis Y-Y over the entire suspension travel Ty. The idler axis 35B may be positioned fore or aft the pivot axis JP1 with respect to the longitudinal axis X-X, depending on the embodiments. The position of the idler 35 may differ depending on its size/diameter. In a particular embodiment, the idler 35 may have a pitch circle diameter of 70 mm±3 mm. This may allow a better load distribution and/or flexion ratio on the chain 6. In an embodiment, the idler 35 is positioned relative to the pivot J1 (positioned, or positioned and sized) such that the chain line of the upper segment of the chain 6 that intermeshes with the idler 35, or the chain line tangent of the idler 35 extends above the pivot axis JP1. In a particular embodiment, the chain line of the upper segment of the chain 6 that intermeshes with the idler 35 extends 6 mm±2 mm (z 0.2362±0.0787 inches) above the pivot axis JP1 when the bicycle 1 is at rest and unloaded.

In other embodiments, the pitch circle diameter of the idler 35 may intersect with the pivot axis JP1. The chain line of the upper segment of the chain 6 that intermeshes with the idler 35 may intersect with the pivot axis JP1. In other words, the idler 35 may have a chain line tangent that intersects the pivot axis JP1. This may limit the pedal kickback and/or variations of chain tension dependent upon the suspension travel position. Because of the particular geometry of the rear suspension, including the high position of the pivot J1 with respect to the bottom bracket BB, the idler 35 may allow greater chain-ground clearance. The idler 35 may allow independent orientation of the chain load relative to the chain ring 4C dimension.

The wheel link 30 rotatably supports the rear wheel 2B at the distal end 32. Referring to FIG. 4, the wheel link 30 defines a hole 38 at the end 32. Such hole 38 extends through both the left and right arms 30L, 30R at the end 32. Such hole 38 (or holes) receives bearing supports 34 similar to that at pivot J1 (as discussed above). Left and right dropout pivot shafts 38L, 38R are mounted to said bearing supports 34. The left and right dropout pivot shafts 38L, 38R interface with the brake link 40. The distal end 42 of the brake link 40 is pivotally connected to the distal end 32 of the wheel link 30 via the left and right dropout pivot shafts 38L, 38R. Components 38, 38L, 38R form part of pivot J2. These components 38, 38L, 38R pivotally interconnect the wheel link 30 to the brake link 40, thereby allowing relative pivotal movement one with respect to the other about pivot J2. The pivot J2 is a floating pivot of the rear suspension, as it may move relative to the main pivot J1 of the rear suspension on the frame 20, or stated differently, it may move relative to the frame 20. The left and right dropout pivot shafts 38L, 38R are adapted to mount the rear wheel axle 2BA to the rear suspension. The pivot J2, in its role of floating pivot, is concentric with the rear wheel axle 2BA. In other words, the rear wheel axis R coincides with the pivot axis JP2 of the pivot J2.

In the depicted embodiment, the brake link 40 includes a left and a right arms 40L, 40R extending on opposite sides of the frame 20. The left and right arms 40L, 40R are connected to each other via a transverse bridge 40B adjacent the axial end 41 of the brake link 40 which is proximal to the frame 20. In the depicted embodiment, the transverse bridge 40B is integral with the left and right arms 40L, 40R, such that parts 40L, 40R and 40B are formed as a single piece. The left and right arms 40L, 40R and the transverse bridge 40B straddle the rear wheel 2B when the rear wheel 2B is mounted on the rear suspension. While the transverse bridge 40B may provide more stiffness to the brake link 40, some embodiments may not have such transverse bridge 40B, such that the left and right arms 40L, 40R of the brake link 40 may extend independently from each other. The brake link 40 extends rearwardly from the frame 20, from the proximal end 41 to an opposite end 42. The brake link 40 defines a hole 48 at the distal end 42, similar to hole 38 of the wheel link 30, to engage the rear wheel axle 2BA. In the depicted embodiment, portions of the left and right dropout pivot shafts 38L, 38R extend through the hole 48. The hole 48 may receive bearing supports, such as hole 38 of the wheel link 30, in addition to or instead of having such bearing supports in the hole 38 of the wheel link 30, depending on the embodiments. In other embodiments, the bearing supports at ends 32, 42 may be flexible mounts, such as a bushing, made at least in part of (at least in part of or entirely of) a resilient material, such as elastomeric material (e.g. rubber), interconnecting the ends 32, 42 of the wheel link 30 and brake link 40. For instance, such resilient mount may be mounted in hole 38 and/or hole 48 and interface with left and right dropout pivot shafts 38L, 38R. By deforming, for instance compression and/or torsion, such resilient mount may allow relative movement of ends 32, 42. The resilient mount may be adhered to or mechanically interlocked with the ends 32, 42 and/or left and right dropout pivot shafts 38L, 38R, for instance. In some cases, such resilient mounting may be more desirable than roller/ball bearings, in that they may be more robust against dust and dirt.

In the depicted embodiment, the distal end 42 of the brake link 40 is transversely inwardly offset with respect to the distal end 32 of the wheel link 30. The end 42 of the brake link 40 is thus closer to the rear wheel 2B plane of rotation than the end 32 of the wheel link 30. The relative position of ends 32, 42 of the wheel link 30 and the brake link 40 may be inverted in other embodiments.

In the depicted embodiment, the brake link 40 is disposed above (at a higher elevation from the ground than) the wheel link 30. The brake link 40 may support components of the rear braking system. As shown, the brake link 40, herein the left arm 40L has bracket anchors 43 embedded in the body of the brake link 40. The bracket anchors 43 extend upwardly from a top surface of the brake link 40. Such bracket anchors 43 may connect to a bracket or directly to a brake caliper, for instance. Although unconventional, the rear brake system and the drivetrain 3 may be inversely disposed with respect to the wheel 2B, such that the brake system may be on the right side of the bicycle 1 and the sprocket 5 on the left side of the bicycle 1.

Returning to FIGS. 2 and 3, the brake link 40 is pivotally connected to the shock linkage 50 at pivot J3. Parts of the brake link 40 and of the shock linkage 50 form part the pivot J3. In the depicted embodiment, the brake link 40 includes bearing supports 44 herein roller bearings, fitted in pivot holes 44A defined in the brake link 40 at a proximal end 41 thereof. Such bearing supports are adapted to receive a male pivot axle 44B, herein a fastener, extending transversely therethrough. These components 44, 44A, 44B form part of the pivot J3. Components 44, 44A, 44B pivotally interconnect the brake link 40 to the shock linkage 50, thereby allowing relative pivotal movement of one with respect to the other about pivot J3. The pivot J3 is a floating pivot, as it may move relative to the frame 20, hence move relative to the main pivot J1 of the rear suspension on the frame 20. The pivot J3 has a pivot axis JP3 about which the brake link 40 and the shock linkage 50 pivot with respect to each other. Components 44, 44B can be considered as parts of the brake link 40 or parts of the shock linkage 50. The shock linkage 50 may include bearings supports forming parts of the pivot J3, in addition to or instead of the bearing supports 44 of the brake link 40.

In the depicted embodiment, the shock linkage 50 includes a left and a right member 50L, 50R disposed on opposite sides of the frame 20. The left and right members 50L, 50R are separate parts, though they may be connected to each other to form a single piece. The members 50L and 50R are pivotally connected to the left and right arms 40L, 40R of the brake link 40, respectively. In the depicted embodiments, the members 50L, 50R defines a triangular structure linking pivots J3, J4 and J5 together. In the depicted embodiment, the members 50L, 50R each have three segments 51A, 51B, 51C extending between respective pivots J3, J4, J5. The segments 51A, 51B, 51C form rigid members holding the pivots J3, J4 and J5 at fixed distance from each other. The members 50L, 50R may have more or less segments in other embodiments, depending on the geometry of the shock linkage 50. The shock linkage 50 is pivotally connected to one axial end 61 of the shock absorber 60. Parts of the shock linkage 50 form part of the pivot J5 and interface with the axial end 61 of the shock absorber 60 (FIG. 2). The connection between the shock linkage 50 and the shock absorber 60 may include similar features than that of pivot J3, for instance, and thus are not repeated herein. Pivot J5 is a floating pivot, for similar reasons as pivot J3 discussed above.

Turning now to the shock absorber 60, such shock absorber 60 may be of any suitable types, including, but not limited to, a fluid damper, spring, or a combination thereof. A first axial end 61 of the shock absorber 60 pivotally connect to the shock linkage 50 as discussed above, while the opposite axial end 62 of the shock absorber 60 is pivotally connected to the frame 20 at pivot J6. The shock absorber 60 may have different sizes and/or dimensions, and/or may be connected to the frame 20 at various locations depending on the embodiments. The orientation and/or position with respect to the frame 20 may change depending the configurations of the rear suspension, The shock absorber 60 pivotally connected to the shock linkage 50 and indirectly pivotally connected to other parts of the rear suspension moves angularly with respect to the frame 20 while the rear wheel 2B moves along its trajectory T.

Figure 5:
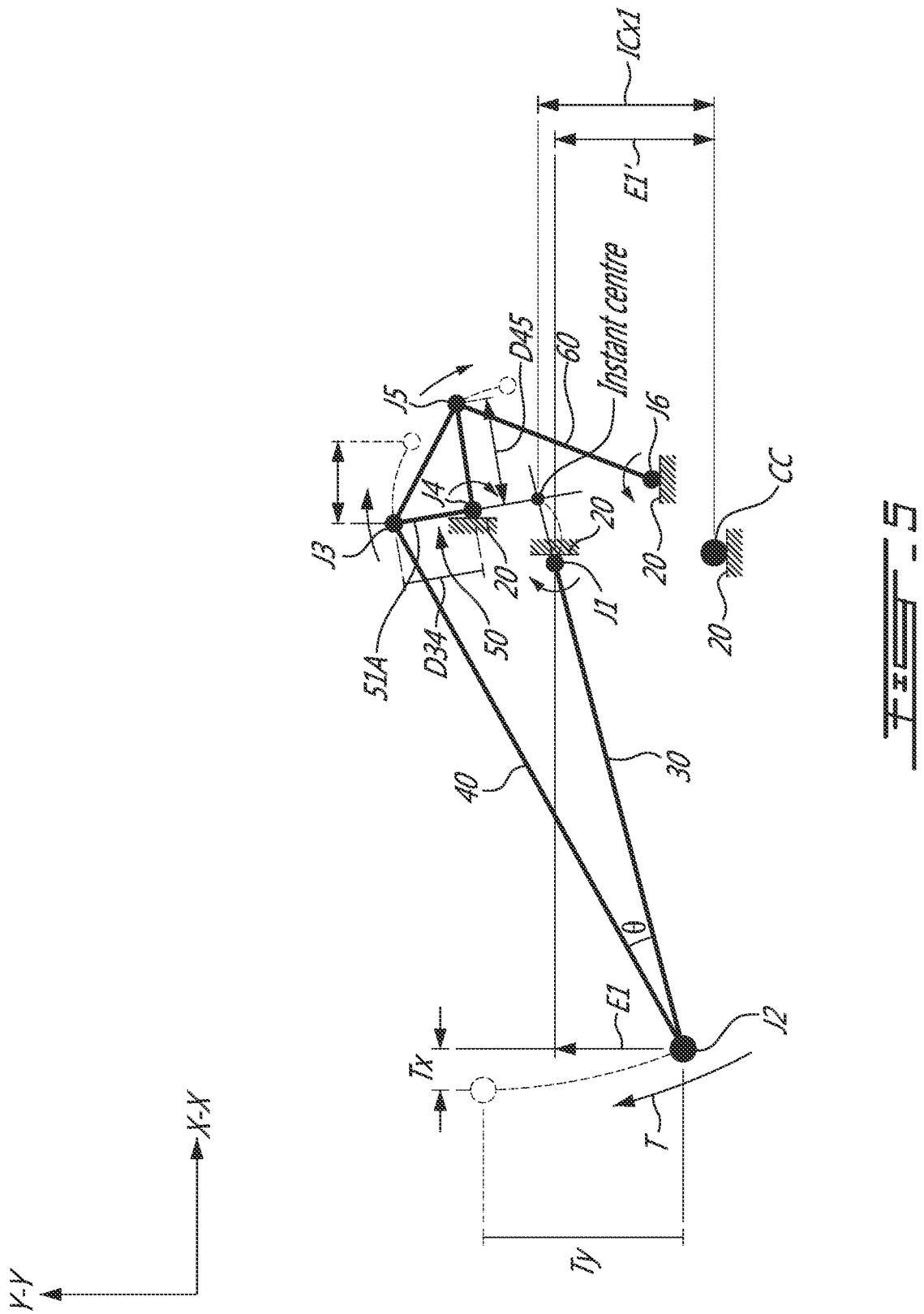
FIG. 5 is a simplified mesh view of the frameset with the rear suspension of FIGS. 2-4 when the bicycle is unloaded.

Relative positions of the pivot J1 to J6 may impact the behavior of the rear suspension, hence the dynamic behavior of the bicycle 1. Referring to FIG. 5, a simplified mesh view of the frameset 10 is shown.

In operation, the rear wheel axle 2BA may move along its trajectory T, which causes a rotation of pivot J2 around pivot J1. Such movement induces a pivotal movement in pivot J2, which in turn induces a rotation and translation of the brake link 40 with respect to the frame 20. Movement of the brake link 40 induces a movement of pivot J3 relative to the frame 20. The proximal end 41 of the brake link 40 pivots relative to the shock linkage 50 at pivot J3. The pivot J3 rotates and translates via forces induced by the brake link 40 to the shock linkage 50. The shock linkage 50 pivots about pivot J4 on the frame 20, which moves pivot J5 in a clockwise direction (with reference to FIG. 5). Compression load is taken by the shock absorber 60, which is compressed between pivot J5 on the shock linkage 50 and pivot J6 on the frame 20 while opposing to such load. When the compression load due to weight of the user on the bicycle 1 and/or impact load on the rear wheel 2B reduces or is released, all these interactions happen reversely (movement of the pivots in the opposite direction than as described above).

Over the entire suspension travel Ty, pivot J3 rotates about pivot J4 at a distance D34 thereof. Pivot J3 has an arcuate trajectory, which consequently imparts a horizontal displacement along direction X-X and a vertical displacement along direction Y-Y of the proximal end 41 of the brake link 40. A variation of angle between the brake link 40 and the segment 51A of the shock linkage 50 that extends between pivots J3 and J4 occurs. Concurrently, a variation of angle θ at pivot J2 between a projection line passing by pivots J1 and J2 (along the wheel link 30) and a projection line passing by pivots J2 and J3 (along the brake link 40) occurs. In a particular embodiment, the variation ("delta") of angle θ over the entire suspension travel Ty is 5°±2° (increasing angle over the entire suspension travel Ty). Such variation of angle θ may be greater in other embodiments where the vertical displacement of pivot J3 is increased, depending on the geometry of the rear suspension. The arcuate trajectory of pivot J3 over the entire suspension travel Ty and the pivotal connection between the wheel link 30 and the brake link 40 provides for such variation. Such variation of angle θ at pivot J2 may allow for better decoupling the braking forces and the forces transmitted to the shock absorber 60 over the entire suspension travel, hence it may provide more anti-rise effect at braking.

The rear suspension may be defined by the relative position of pivots J1 to J4 and the pivotally interconnected links 30, 40, 51A forming parts of the rear suspension. The rear suspension has an instant centre of rotation (or simply "Instant Centre") that moves relative to pivot J1 (or other fixed points on the frame 20) as the rear wheel 2B travels along its trajectory T. The Instant Centre is defined by an intersection point between a projection line passing by pivot J1 and J2 (line along the wheel link 30) and a projection line passing by pivots J3 and J4 (line along segment 51A). Such Instant Centre moves along an Instant Centre trajectory over the suspension travel Ty. In the depicted embodiment, over the suspension travel Ty, the Instant Centre moves toward pivot J1. In the depicted embodiment, the Instant Centre moves toward pivot J1 without moving rearwardly beyond pivot J1. In the depicted embodiment, the position of the Instant Centre remains at an elevation ICx1≥than the elevation E1' of pivot J1 over the entire suspension travel Ty. The Instant Centre trajectory is shown at FIG. 5 in broken line. Other embodiments of the rear suspension may have different Instant Centre trajectory, though the one shown is representative of the embodiment shown in FIGS. 2-4.

As shown, the pivot J1 is located above the crankset rotational axis CC, i.e. at a higher elevation. Also shown, the pivot J1 is located at a higher elevation than the pivot J2 when the bicycle is in an unloaded state (bicycle 1 is at rest, without external loads applied to it). The elevation E1 of the pivot J1 relative to the pivot J2 may correspond to between 30% and 125% of the suspension travel Ty (or "total available vertical rear wheel displacement"), where E1 is taken with the suspension in an uncompressed state (when the bicycle 1 is at rest and unloaded). This may correspond to an elevation E1 between 75 mm ($\infty$2.95 inches) and 250 mm ($\approx z \approx$9.84 inches). In the depicted embodiment, the elevation E1 of the pivot J1 relative to the pivot J2 corresponds to 95% of the suspension travel Ty. In such case, a ratio of the rearward horizontal component Tx of the trajectory T the wheel axis BA over the suspension travel Ty of the rear wheel 2B is 13%±5%.

In the depicted embodiment, the pivot J4 is position above (at a higher elevation than) the pivot J1. The pivot J4 may be positioned below pivot J1 in other embodiments, such as discussed later. Pivot J1 is positioned rearward relative to pivot J4, along the longitudinal axis X-X of the bicycle 1. The relative distances between pivots J3, J4 and J5 may influence the leverage ratio and/or the progressivity in damping and/or stiffness of the rear suspension. In an embodiment, a ratio of a distance D45 between pivot J4 and J5, and a distance D34 between pivot J3 and J4 (D45/D34) has a value between 1:1 and 1.5:1. In the depicted embodiment, a distance between pivot J3 and J4, and a distance between pivot J4 and J5 are the same (±5%). In a particular embodiment, the ratio of the distance D45 over the distance D34 is 1.2:1.

Referring to FIGS. 6, 6A, and 7, another embodiment of the frameset 10 and rear suspension is illustrated. The like components with the embodiment of FIGS. 1-5 are identified with corresponding reference numbers in the 100's. The reader can refer to corresponding components above for more detail on how the rear suspension operates.

In this embodiment, the rear suspension includes pivots J1 to J6 as described above, and it operates similarly. The frame 120 includes top tube 121, down tube 122, seat tube 123, frame pivot shoulder, flat plateau, transverse hole, bearing supports, and pivot axle, similar to that described above, thus not identified on FIGS. 6-7 and described in detail again. While the frame 120 includes a linkage pivot shoulder 125 with flat plateau 125A, transverse hole 125B, bearing supports 125C and pivot axle 125D, which form part of pivot J4 similar to that described above, some differences are now pointed out.

The seat tube 123 of the frame 120 defines an opening 123A to receive at least part of the shock linkage 150. In other words, the seat tube 123 at least partially houses the shock linkage 150. The seat tube 123 defines a left and a right side segments 123L, 123R transversely spaced apart from each other, with the opening 123A defined in between them. With reference to FIG. 6A, showing a magnified zone of the seat tube 123 with some components hidden for viewing, the linkage pivot shoulder 125 projects transversely inwardly with respect to the frame 120, from opposite internal surfaces 123B of the segments 123L, 123R. Although only 123L shown, it should be understood that 123R is arranged similarly at the opposite side. Flat plateaus 125A on the side segments 123L, 123R face each other. The shock linkage 150 is disposed inside the opening 123A (FIG. 6). The shock linkage 150 is pivotally mounted between the opposite flat plateaus 125A of the left and right segment 123L, 123R. Other aspects of the shock linkage 150 are described later.

The rear suspension includes a wheel link 130, a brake link 140, a shock linkage 150 and a shock absorber 160. These components 130, 140, 150 and 160 are pivotally connected together, as described above in connection with FIGS. 1-5. The wheel link 130 includes left and right arms 130L, 130R, and a transverse bridge 130B, though bridge 130B is optional, as described above. Similarly, the brake link 140 includes left and right arms 140L, 140R, and a transverse bridge 140B. The wheel link 130 is pivotally connected to the frame at pivot J1, which defines the main pivot of the rear suspension. The wheel link 130 and the brake link 140 are pivotally connected to each other at pivot J2, with such pivot J2 coinciding with the rear wheel axle 2BA. In the depicted embodiment, left and right dropout pivot shafts 138L, 138R interconnect the wheel link 130 and the brake link 140, and form part of pivot J2. The wheel link 130 includes an idler 135 pivotally mounted thereto, as in FIGS. 1-5. Relative position between idler 135 and idler pivot axis 135B relative to pivot J1 correspond to what is described above, so they are not repeated for conciseness.

In the depicted embodiment, the wheel link 130 and the brake link 140 are inverted with respect to each other. In other words, the wheel link 130 extends above the brake link 140. Stated differently, the wheel link 130 extends at a higher elevation than the brake link 140. In the depicted embodiment, the shock linkage 150 is disposed between the wheel link 130 and the brake link 140 along the vertical axis Y-Y. As shown, pivot J4 is positioned between pivot J1 and pivot J3 along the vertical axis Y-Y, with pivot J3 being the closest pivot relative to the bottom bracket BB.

FIG. 7 shows the same embodiment than FIG. 6, though some components are hidden to better show the shock linkage 150. Parts of the shock linkage 150 form part of the pivot J3, J4 and J5, as described above. In the depicted embodiment, the shock linkage 150 does not have left and right members as members 50L, 50R described above. The shock linkage 150 defines a body 150B, herein a one-piece body, pivotally connected to the left and right arms 140L, 140R of the brake link 140. The shock linkage 150 includes segments 151A, 151B extending between respective pivots J3, J4, J5. The segments 151A, 151B form rigid members holding the pivots J3, J4 and J5 at fixed distance from each other. Pivots J3 and J5 are floating pivots. The shock linkage 150 includes a floating segment 151F pivotally connected to segment 151A at pivot J5. The floating segment 151F interconnects the shock linkage body 150B to the shock absorber 160. The floating segment 151F is an intermediary part between the shock linkage body 150B and the shock absorber 160.

The shock absorber 160 is pivotally connected to the shock linkage body 150B via the floating segment 151F, and pivotally connected to the frame 120 at pivot J6. The shock absorber 160 is pivotally mounted to the frame 120 via a bracket 122A of the down tube 122. In this embodiment, the bracket 122A is integral with the down tube 122, though it may be a separate part in other embodiment (e.g. welded, fastened, or otherwise connected to the down tube 122). In the depicted embodiment, the shock absorber 160 is oriented differently than that shown in the embodiment of FIGS. 1-5 relative to the frame 120. In the depicted embodiment, pivot J6 is at a higher elevation with respect to all other pivots J1 to J5 when the rear suspension is uncompressed/unloaded. This is shown in FIG. 8.

Figure 8:
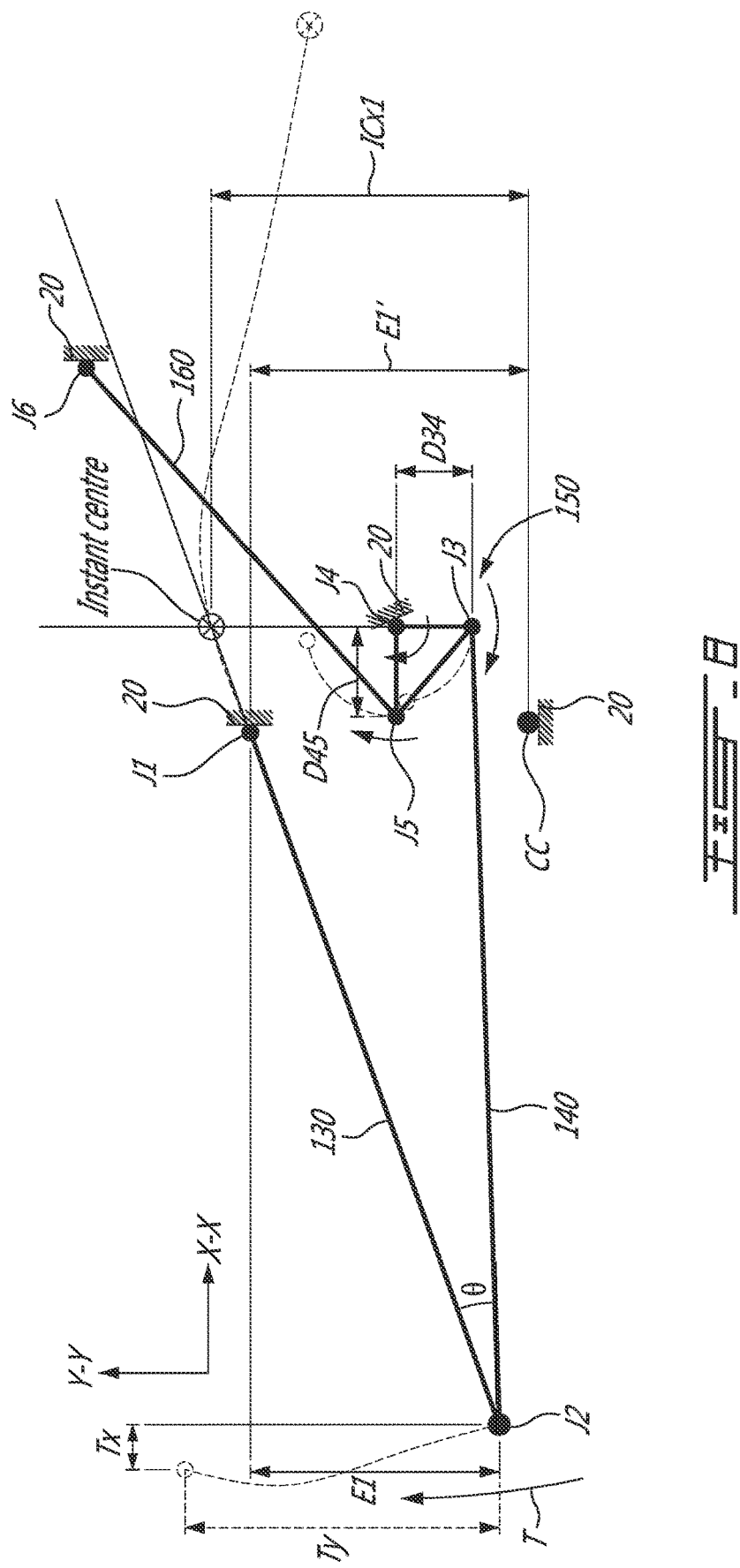
FIG. 8 is a simplified mesh view of the frameset with the rear suspension of FIGS. 6-7 when the bicycle is unloaded.

Referring to FIG. 8, a simplified mesh view of the frameset 10 is shown with the geometry of the rear suspension of FIGS. 6-7.

In operation, the rear wheel axle 2BA moves along its trajectory T, which causes a rotation of pivot J2 and rear wheel axle 2BA around pivot J1. Such movement induces a pivotal movement in pivot J2, which in turn induces a rotation and translation of the brake link 140 with respect to the frame 120. Movement of the brake link 140 induces a movement of pivot J3 relative to the frame 120. The proximal end 141 of the brake link 140 pivots relative to the shock linkage 150 at pivot J3. The pivot J3 rotates and translates via forces induced by the brake link 140 to the shock linkage 150. The shock linkage 150 pivots about pivot J4 on the frame 120, which moves pivot J5 in a clockwise direction (with reference to FIG. 8). Compression load is taken by the shock absorber 160, which is compressed between pivot J5 on the shock linkage 150 and pivot J6 on the frame 120 while opposing to such load. When the compression load due to weight of the user on the bicycle 1 and/or impact load on the rear wheel 2B reduces or is released, all these interactions happen reversely (movement of the pivots in the opposite direction than as described above).

Over the entire suspension travel Ty, pivot J3 rotates about pivot J4 at a distance D34 thereof. Pivot J3 has an arcuate trajectory, which consequently imparts a horizontal displacement along direction X-X and a vertical displacement along direction Y-Y of the proximal end 141 of the brake link 140. A variation of angle between the brake link 140 and the segment 151A of the shock linkage 150 that extends between pivots J3 and J4 occurs. Concurrently, a variation of angle θ at pivot J2 between a projection line passing by pivots J1 and J2 (along the wheel link 130) and a projection line passing by pivots J2 and J3 (along the brake link 140) occurs. In a particular embodiment, the variation ("delta") of angle θ over the entire suspension travel Ty is 10°±5° (decreasing angle over the entire suspension travel Ty). Such variation of angle θ may be greater in other embodiments where the vertical displacement of pivot J3 is increased, depending on the geometry of the rear suspension. The arcuate trajectory of pivot J3 over the entire suspension travel Ty and the pivotal connection between the wheel link 130 and the brake link 140 provides for such variation. Such variation of angle θ at pivot J2 may allow for better decoupling the braking forces and the forces transmitted to the shock absorber 160 over the entire suspension travel, hence it may provide more anti-rise effect at braking.

The rear suspension geometry may be defined by the relative position of pivots J1 to J4 and the pivotally interconnected links 130, 140, 151A forming parts of the rear suspension. The rear suspension geometry has an Instant Centre that moves relative to pivot J1 (or other fixed points on the frame 20) as the rear wheel 2B travels along its trajectory T The Instant Centre is defined by an intersection point between a projection of the wheel link 130 and a projection segment 151A interconnecting pivots J3 and J4. Such Instant Centre moves along an Instant Centre trajectory over the suspension travel Ty. In the depicted embodiment, over the suspension travel Ty, the Instant Centre moves away from pivot J1, toward the front of the bicycle 1. In the depicted embodiment, the position of the Instant Centre is at an elevation ICx1≥than the elevation of pivot J1 when the rear suspension is at the rest position and unloaded, and the position of the Instant Centre transitions to an elevation ICx1<than the elevation E1' of pivot J1 while reaching the total available vertical rear wheel displacement. When the rear suspension reaches the total available vertical rear wheel displacement, the position of the Instant Centre is at an elevation ICX1 between the elevation E1' of pivot J1 and the elevation of pivot J4 relative to the crankset rotational axis CC. The Instant Centre trajectory is shown at FIG. 8 in broken line. Other embodiments of the rear suspension may have different Instant Centre trajectory, though the one shown is representative of the embodiment shown in FIGS. 6-7.

As shown, the pivot J1 is located above the bottom bracket BB, i.e. at a higher elevation. Also shown, the pivot J1 is located at a higher elevation than the pivot J2 when the bicycle 1 is in an unloaded state (bicycle 1 is at rest, without external loads applied to it). The elevation E1 of the pivot J1 relative to the pivot J2 may correspond to between 30% and 125% of the suspension travel Ty (or "total available vertical rear wheel displacement"), where E1 is taken with the suspension in an uncompressed state (when the bicycle 1 is at rest and unloaded). This may correspond to an elevation E1 between 75 mm (≈2.95 inches) and 250 mm (≈9.84 inches). In the depicted embodiment, the elevation E1 of the pivot J1 relative to the pivot J2 corresponds to 75%±5 of the suspension travel Ty. In such case, a ratio of the rearward horizontal component Tx of the trajectory T the wheel axis BA over the suspension travel Ty of the rear wheel 2B is 13%±5%.

In the depicted embodiment, the pivot J4 is position below (at a lower elevation than) the pivot J1. Pivot J1 is positioned forward relative to pivot J4, along the longitudinal axis X-X of the bicycle 1.

The relative distances between pivots J3, J4 and J5 may influence the leverage ratio and/or the progressivity in damping and/or stiffness of the rear suspension. In an embodiment, a ratio of a distance D45 between pivot J4 and J5, and a distance D34 between pivot J3 and J4 (D45/D34) has a value between 1:1 and 1.5:1. In the depicted embodiment, a distance between pivot J3 and J4, and a distance between pivot J4 and J5 are the same (±5%). In a particular embodiment, the ratio of the distance D45 over the distance D34 is 1.2:1.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A frameset of a bicycle, comprising:
   a frame having a bottom bracket defining a crankset rotational axis, the frame defining a rear suspension pivot at a higher elevation than the crankset rotational axis; and
   a rear suspension for suspending a rear wheel of the bicycle, the rear suspension defining a suspension travel of the suspended rear wheel relative to the frame, the rear suspension including a wheel link, a brake link separate from the wheel link, and a shock linkage, the wheel link pivotally connected to the rear suspension pivot of the frame thereby defining a main fixed pivot axis, the wheel link and the brake link pivotally connected to each other via a first floating pivot, the first floating pivot concentric with a rear wheel rotational axis, an elevation of the main fixed pivot axis relative to the first floating pivot corresponding to between 30% and 125% of the suspension travel when the rear suspension is in a rest position and unloaded, the shock linkage pivotally mounted to the frame at a fixed location thereon, the brake link and the shock linkage pivotally connected to each other via a second floating pivot, the wheel link having an idler pivotally mounted thereto, the idler configured to intermesh with an upper chain segment running from a rear wheel sprocket to a chain ring, the idler having an idler pivot axis positioned below a projection line extending from the first floating pivot to the main fixed pivot axis.

2. The frameset as defined in claim 1, wherein the elevation of the main fixed pivot axis relative to the first floating pivot corresponds to 95%±5% of the suspension travel.

3. The frameset as defined in claim 1, wherein the wheel link and the brake link angularly moves relative to each other over the suspension travel such that an angle at the first floating pivot between a projection line passing by the main fixed pivot axis and a pivot axis of the first floating pivot and a projection line passing by the first floating pivot axis and a pivot axis of the second floating pivot varies.

4. The frameset as defined in claim 1, wherein the idler pivot axis remains at a fixed distance from the main fixed pivot axis and the first floating pivot over the suspension travel, and wherein the idler pivot axis is positioned rearward relative to the main fixed pivot axis on the frame.

5. The frameset as defined in claim 1, wherein the idler pivot axis is positioned relative to the main fixed pivot axis such that a chain line tangent of the idler extends above the main fixed pivot axis when the rear suspension is at the rest position and unloaded.

6. The frameset as defined in claim 1, wherein the rear suspension has an instant centre of rotation that moves towards the main fixed pivot axis over the entire suspension travel.

7. The frameset as defined in claim 6, wherein the instant centre of rotation moves towards the main fixed pivot axis over the entire suspension travel without moving rearwardly beyond the main fixed pivot axis.

8. The frameset as defined in claim 6, wherein the instant centre of rotation remains at an elevation than an elevation of the main fixed pivot axis relative to the crankset rotational axis over the entire suspension travel.

9. The frameset as defined in claim 1, the wheel link includes a left arm and a right arm extending on opposite sides of the frame, a proximal end of the left and right arms being pivotally connected to the frame, wherein the wheel link right arm includes a recessed area at the proximal end thereof, the recessed area defining a flat surface that is transversely offset in a vertical plane relative to an adjacent outwardly facing surface of the wheel link, the idler being mounted in the recessed area.

10. A bicycle, comprising:
a frame having a bottom bracket defining a crankset rotational axis, the frame defining a rear suspension pivot located at a higher elevation than the crankset rotational axis;
a drivetrain mounted to the bottom bracket, the drivetrain including a crankset drivingly engaged to a sprocket of a rear wheel via a chain;
a front wheel mounted to the frame via a steerable front fork;
a rear suspension suspending a rear wheel mounted to the rear suspension via a rear wheel axle for rotation about a rear wheel axis, the rear suspension defining a suspension travel of the suspended rear wheel relative to the frame, the rear suspension including:
a wheel link, a brake link separate from the wheel link, and a shock linkage, the wheel link pivotally connected to the rear suspension pivot of the frame thereby defining a main fixed pivot axis, the wheel link and the brake link pivotally connected to each other via a first floating pivot, the first floating pivot concentric with the rear wheel axis, the wheel link having an idler pivotally mounted thereto, the idler engaging a chain segment between the sprocket of the rear wheel and the crankset, the idler having an idler pivot axis positioned below a projection line extending from the first floating pivot to the main fixed pivot axis, an elevation of the main fixed pivot axis relative to the first floating pivot corresponding to between 30% and 125% of the suspension travel when the rear suspension is in a rest position and unloaded, the shock linkage pivotally mounted to the frame via a shock linkage pivot on the frame, the brake link and the shock linkage pivotally connected to each other via a second floating pivot, a shock absorber having a first end pivotally mounted to the frame at a fixed location thereon and a second end pivotally mounted to the shock linkage via a third floating pivot.

11. The bicycle as defined in claim 10, wherein the elevation of the main fixed pivot axis relative to the first floating pivot corresponds to 95%±5% of the suspension travel.

12. The bicycle as defined in claim 10, wherein the wheel link and the brake link angularly moves relative to each other over the suspension travel such that an angle at the first floating pivot between a projection line passing by the main fixed pivot axis and a pivot axis of the first floating pivot and a projection line passing by the first floating pivot axis and a pivot axis of the second floating pivot varies.

13. The bicycle as defined in claim 12, wherein the angle increases of 5°±2° over the entire suspension travel.

14. The bicycle as defined in claim 10, wherein the idler pivot axis remains at a fixed distance from the main fixed pivot axis and the first floating pivot over the suspension travel.

15. The bicycle as defined in claim 10, wherein the idler pivot axis is positioned rearward relative to the main fixed pivot axis on the frame.

16. The bicycle as defined in claim 10, wherein the idler pivot axis is positioned relative to the main fixed pivot axis such that a chain line tangent of the idler extends above the main fixed pivot axis when the rear suspension is at the rest position and unloaded.

17. The bicycle as defined in claim 10, wherein the rear suspension has an instant centre of rotation that moves towards the main fixed pivot axis over the entire suspension travel.

18. The bicycle as defined in claim 17, wherein the instant centre of rotation moves towards the main fixed pivot axis over the entire suspension travel without moving rearwardly beyond the main fixed pivot axis.

19. The bicycle as defined in claim 17, wherein the instant centre of rotation remains at an elevation than an elevation of the main fixed pivot axis relative to the crankset rotational axis over the entire suspension travel.

20. The bicycle as defined in claim 10, wherein the wheel link includes a left arm and a right arm extending on opposite sides of the frame, a proximal end of the left and right arms being pivotally connected to the frame, and wherein the wheel link right arm includes a recessed area at the proximal end thereof, the recessed area defining a flat surface that is transversely offset in a vertical plane relative to an adjacent outwardly facing surface of the wheel link, the idler being mounted in the recessed area, wherein a transverse position of the idler with respect to the frame is such that a plane of rotation of the idler coincides with a plane of rotation of the chain ring.

* * * * *